March 20, 1956  W. L. MEIER  2,739,248
ELECTROSTATIC GENERATOR

Filed May 10, 1952  2 Sheets-Sheet 1

INVENTOR.
WILBER L. MEIER
BY
Ralph E. Bitner.
ATTORNEY

March 20, 1956 W. L. MEIER 2,739,248
ELECTROSTATIC GENERATOR

Filed May 10, 1952 2 Sheets-Sheet 2

INVENTOR.
WILBER L. MEIER
BY Ralph E. Bitner
ATTORNEY

United States Patent Office 2,739,248
Patented Mar. 20, 1956

2,739,248

ELECTROSTATIC GENERATOR

Wilber L. Meier, Chatham, N. J., assignor to Gera Corporation, New York, N. Y., a corporation of New Jersey Application May 10, 1952, Serial No. 287,154

4 Claims. (Cl. 310—6)

This invention relates to electrostatic generators of the induction type and has particular reference to the arrangement of a plurality of collector brushes and induction plates to provide efficient generating action and increased current.

Many types of electrostatic generators have been designed and constructed to produce high voltage electrical power. Generally these machines were used to demonstrate the action of high voltages and the question of polarity was not important. All known prior art machines of the induction type were characterized by the fact that a maximum voltage was generated and very little current.

Prior art electrostatic generators have been designed and built to produce high voltage. The production of comparatively large currents at lower voltages ranging from 5,000 to 20,000 volts has generally been overlooked. For this reason the older generators used only one set of stator induction plates and have generally relied on high voltage capacitors to accumulate a charge when a high current discharge was desired.

The present design employs a plurality of stator plates disposed around the periphery of the rotor. Alternate stator plates are connected together and the older diametral conductor is expanded to a multiple brush neutralizing conductor. In order to accommodate the additional brushes necessary, the contact areas on the rotating sectors are shortened and heavy insulation is placed over the remaining sector arcs.

One of the objects of the present invention is to provide a generator which is capable of delivering higher current values than was possible with prior art machines.

Another object of the invention is to provide a generator which is steady in power output.

Another object of the invention is to insure the continued performance of an electrostatic generator even though the high voltage terminals may be short circuited or discharged.

The invention comprises an electrostatic generator which includes a disk shaped rotor containing a number of conducting sectors embedded in the material. Brushes are mounted to make contact with the conducting sectors at the edge of the rotor disk and at points near the center of the disk where a small tab portion of the sector projects. A plurality of sets of stator induction plates are mounted close to the disk surface for inducing a charge in the rotating conducting sectors. A neutralizing conductor, terminated by brushes, is employed to aid in charging the sectors as they pass through the electrostatic field of the stator plates. A second set of brushes is employed to replenish the charge on the stator plates from the charged sectors, and a third set of brushes is positioned adjacent to the stator induction plates to transfer the generated charges to a pair of output or load terminals.

For a better understanding of the present invention, together with other and further objects thereof, reference is made to the following description taken in connection with the accompanying drawings.

Figure 1:
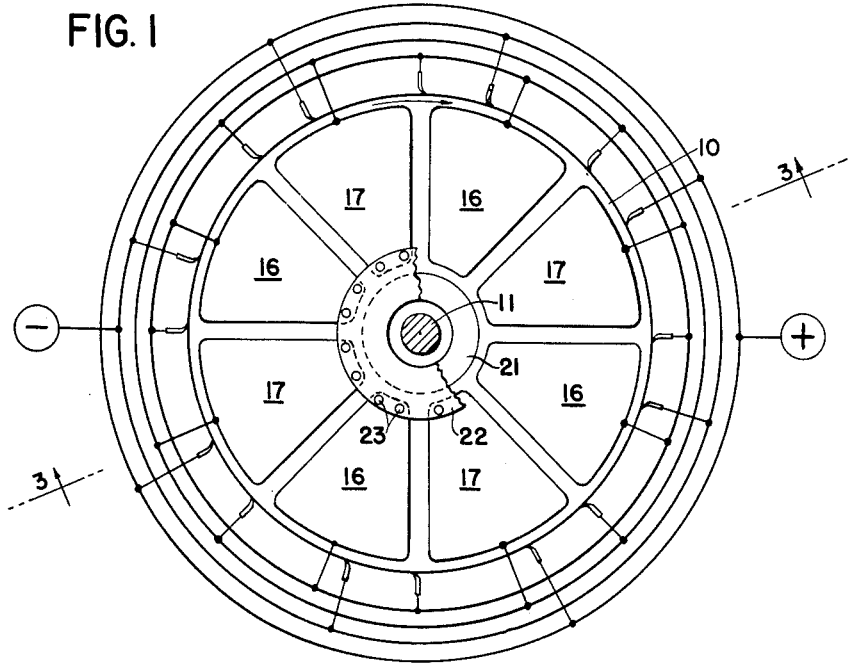
Fig. 1 is a side view of the generator showing the main components with some of the mounting brackets removed and the wiring shown in schematic form.
Figure 2:
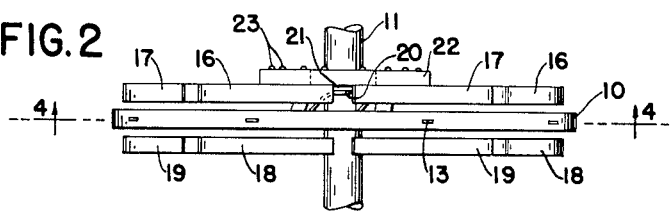
Fig. 2 is a side view of the generator looking at the edge of the rotor with the wiring and mounting brackets removed.
Figure 3:
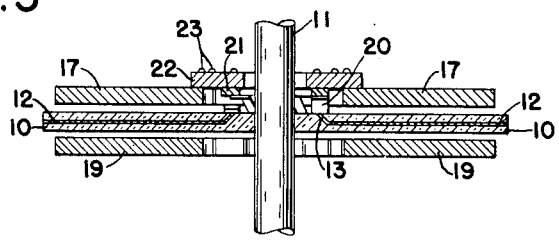
Fig. 3 is a cross sectional view of the generator taken along line 3—3 of Fig. 1.

Referring now to Figs. 1, 2, 3, and 4, a rotor 10, made of non-conducting material, is mounted for rotation on a shaft 11 which is turned by any convenient means. Embedded in the body of the rotor are a number of conducting sectors 12, formed in a wedge-shaped outline each with one small tab 13 flush with the rotor edge and another similar tab 14 flush with one side of the rotor surface near the shaft 11.

Figure 4:
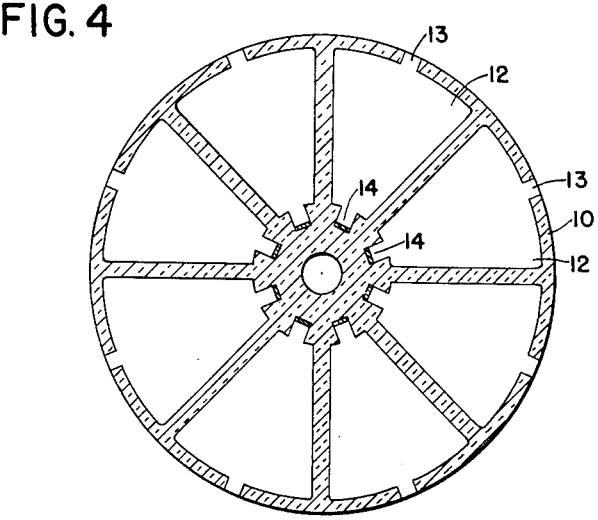
Fig. 4 is a cross sectional view of the rotor taken along line 4—4 of Fig. 2.

The conducting sectors 12 are positioned in the rotor body as indicated in Fig. 4 in a single plane except for the tabs 14 which are bent to emerge at the flat surface where they may make contact with brushes connected to the neutralizing conductor. To induce an electrostatic charge in the conducting sectors, a plurality of induction stator plates 16, 17, 18, and 19 are mounted in the position shown close to the rotor face. The stator plates are made of metal and have no insulating covering other than the air gap between themselves and the rotor face. The stator plates are held in place by conventional insulating retaining means (not shown) which are generally secured to the outside faces of the plates and play no part in the electrical operation of the generator. Stator plates 17 and 19 are all connected together as are stator plates 16 and 18.

Three sets of brushes are used with the generator. One set 20 is mounted close to the shaft 11 on a ringshaped neutralizing conductor 21 which may be grounded. Conductor 21 is secured to an insulator disk 22 which is secured to all the stator plates on one side of the machine by rivets 23. Brushes 20 are shaped to make contact with tabs 14 for a short interval of time as the rotating sectors pass between two opposite stator plates. A second set of brushes 24 is connected to the stator plates (see Fig. 5) and makes contact with tabs 13 as the charged sectors are entering the electric field of the stator plates. These brushes collect a small charge from the sectors to keep the stator plates fully charged at all times. A third set of brushes 25 are mounted to make contact with the tabs 13 shortly after they have made contact with brushes 24 and before tabs 14 come in contact with brushes 20. Half of brushes 25 are connected to the positive terminal 26 of the generator while the other half (alternately spaced) are connected to the negative terminal 27.

Figure 5:
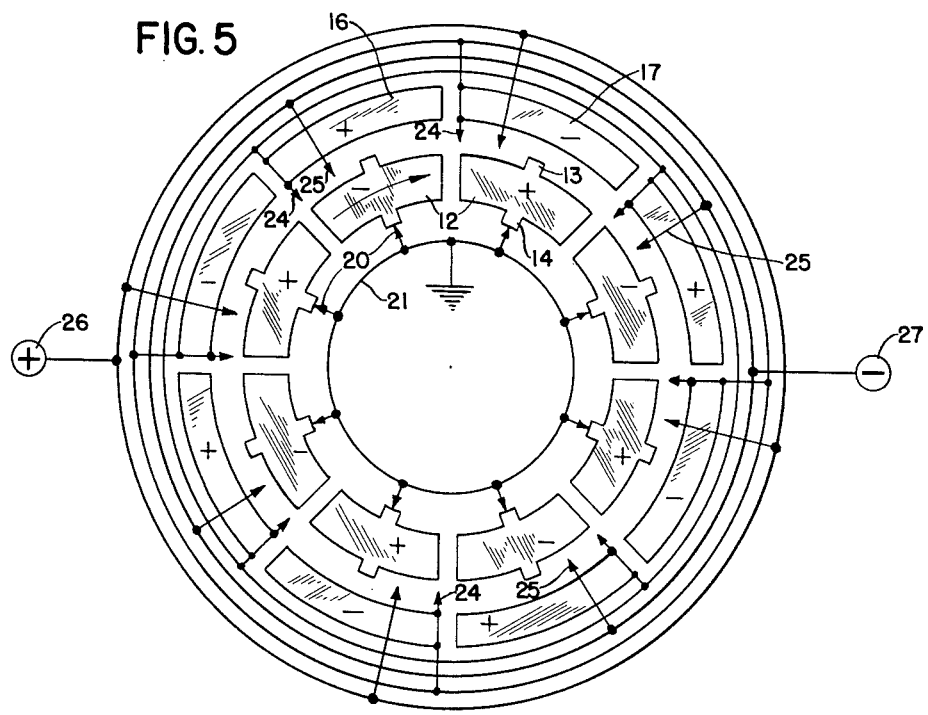
Fig. 5 is a schematic diagram of the machine showing all wiring and essential electrical components.

The operation of the machine is as follows; reference being made to the schematic diagram of Fig. 5. The inductor plates must be initially charged to a small potential in order to create an electric field which can induce a charge on the rotor sectors. This initial charge may be obtained by a battery, a separate friction generator, or the plates and sectors may be made of materials having dissimilar work functions as explained in U. S. Patent 2,577,446 issued December 4, 1951, to Carl Bosch. The rotor 10 is then rotated, in a clockwise direction as shown in Fig. 5, and the generator builds up potentials on the inductor plates and the rotating sectors making the accumulated charges available to a load circuit.

Let it be assumed that stator inductor plates 16 and 18 are given a positive charge by an external source of potential while plates 17 and 19 remain at zero potential. Then an electrostatic field is created between plates 16 and 17 and when the rotating sectors are all connected together by brushes 20 and neutralizing conductor 21 unlike charges are created by induction on each sector. When the sectors are disconnected from brushes 20 they retain their charges and when moved from the field of one stator plate into their field of an adjacent plate which is oppositely charged the voltage is increased. At the position where brushes 24 make contact with tabs 13 the voltage has increased to at least twice the induced value. Connection with brushes 24 adds more charge to the stator plates. When the rotating sectors move into contact with the terminal brushes 25 they give their charges to the conductors connected to terminals 26 and 27 making the accumulated charges available to a load circuit. Then the sectors again move to a position where they make contact with brushes 20 and the same process is repeated except that this time the electric field is greater and the induced charge is greater. This building up process continues until losses or leakage cause a limiting value to be reached.

The above is believed to be a correct explanation of the principles underlying applicant's invention. However, further investigation may lead to a modification of this theory. It is to be understood that the invention is independent of any theory that may be advanced to account for the results obtained.

While there have been described and illustrated specific embodiments of the invention, it will be obvious that various changes and modifications may be made therein without departing from the field of the invention which should be limited only by the scope of the appended claims.

I claim:

1. An electrostatic induction generator comprising; a disk shaped rotor composed of insulating material and containing a plurality of conducting sectors embedded in the body of the rotor material; a plurality of stator induction plates positioned adjacent to the rotor for inducing a charge on the rotor sectors, the number of stator plates being even and equal to the number of rotor sectors; means for connecting alternate stator plates to each other; a neutralizing conductor connected to a plurality of brushes, said brushes equal in number to the number of rotor sectors and positioned so as to make contact with the sectors as the rotor is turned; a like number of collector brushes for charging the stator induction plates when the conducting rotor sectors move into the electric field of the plates; and a like number of terminal brushes for making contact with the rotating sectors while in the field of the stator plates for removing the accumulated charges.

2. An electrostatic induction generator comprising; a disk shaped rotor composed of insulating material and containing a plurality of conducting sectors embedded in the body of the rotor material, said sectors including two tab portions which extend to the surface of the rotor; a plurality of stator inductor plates positioned adjacent to the rotor for inducing a charge on the rotor sectors, the number of stator plates being even and equal to the number of rotor sectors; means for connecting alternate stator plates to each other; a neutralizing conductor connected to a plurality of brushes, said brushes equal in number to the number of rotor sectors and positioned so as to make contact with the tabs on the sectors as the rotor is turned; a like number of collector brushes for charging the stator induction plates when the conducting rotor sectors move into the electric field of the plates; and a like number of terminal brushes for making contact with tabs connected to the rotating sectors while in the field of the stator plates for removing the accumulated charges.

3. An electrostatic induction generator comprising; a disk shaped rotor of insulating material mounted for rotation and containing a plurality of conducting sectors embedded in the body of the rotor material, said sectors including two tab portions which extend to the surface of the rotor insulating material where contact is made with collector brushes; a plurality of stator induction plates positioned adjacent to the rotor for inducing a charge on the rotor sectors, the number of stator plates being even and equal to the number of rotor sectors; connecting means which connect alternate stator plates to each other; a neutralizing conductor connected to a plurality of brushes, said brushes equal in number to the number of rotor sectors and positioned so as to make contact with the tabs on the sectors as the rotor is turned; a like number of collector brushes for charging the stator induction plates when the conducting rotor sectors move into the electric field of the plates; and a like number of terminal brushes for making contact with tabs connected to the rotating sectors while in the field of the stator plates for removing the accumulated charges and transferring them to output terminals.

4. An electrostatic induction generator comprising; a flat disk shaped rotor of insulating material mounted for rotation and containing a plurality of conducting sectors embedded in the body of the rotor material, said sectors including two tab portions which extend to the surface of the rotor insulating material where contact is made with collector brushes; a plurality of stator induction plates positioned adjacent to the flat portion of the rotor disk and on each side thereof for inducing a charge on the rotor sectors, the number of stator positions being even and equal to the number of rotor sectors; connecting means which connect the stator plates in alternate positions to each other; a neutralizing conductor connected to a plurality of brushes, said brushes equal in number to the number of rotor sectors and positioned so as to make contact with one of the tabs on each rotor sector as the rotor is turned; a like number of collector brushes for charging the stator induction plates when the conducting rotor sectors move into the electric field of the plates; and a like number of terminal brushes for making contact with another of the tabs connected to the rotating sectors while in the field of the stator plates for removing the accumulated charges and transferring them to output terminals.

References Cited in the file of this patent

UNITED STATES PATENTS

| 791,310 | Baker | May 30, 1905 |
| 883,846 | Wommelsdorf | Apr. 7, 1908 |
| 1,071,196 | Wommelsdorf | Aug. 26, 1913 |
| 2,009,503 | Landwerlin | July 30, 1935 |
| 2,519,554 | Felici | Aug. 22, 1950 |
| 2,523,689 | Felici | Sept. 26, 1950 |
| 2,577,446 | Bosch | Dec. 4, 1951 |